United States Patent

Carey

[11] 4,186,778
[45] Feb. 5, 1980

[54] HOSE CONSTRUCTION HAVING INTEGRAL FIRE EXTINGUISHANT AND METHOD OF MAKING SAME

[75] Inventor: Richard D. Carey, Waynesville, N.C.

[73] Assignee: Dayco Corporation, Dayton, Ohio

[21] Appl. No.: 910,922

[22] Filed: May 30, 1978

[51] Int. Cl.² .......................................... F16L 11/12
[52] U.S. Cl. .................................... 138/103; 138/122;
138/125; 138/129; 138/177; 138/178; 174/121
A; 174/47; 156/143
[58] Field of Search ............... 138/103, 121, 122, 125,
138/126, 129, 177, 178; 428/913, 921, 922;
169/35; 252/2, 8.1; 174/121 A, 47; 156/143, 144

[56] References Cited

U.S. PATENT DOCUMENTS

| | | | |
|---|---|---|---|
| 3,006,381 | 10/1961 | Rothermel et al. | 138/122 |
| 3,152,618 | 10/1964 | Rothermel et al. | 138/122 |
| 3,300,571 | 1/1967 | Downey et al. | 174/47 |
| 3,329,172 | 7/1967 | Osborn | 138/122 |
| 3,393,155 | 7/1968 | Schutte et al. | 252/2 X |
| 3,566,323 | 2/1971 | Zwickert | 252/8.1 X |
| 3,585,135 | 6/1971 | Smith et al. | 252/8.1 |
| 3,778,337 | 12/1973 | Mand et al. | 428/921 X |
| 3,823,745 | 7/1974 | Schafenacker | 138/103 |
| 3,839,239 | 10/1974 | Godfried | 252/8.1 |
| 3,843,831 | 10/1974 | Hutchison et al. | 174/121 A X |
| 3,928,210 | 12/1975 | Peterson | 428/921 X |
| 3,939,107 | 2/1976 | Brown | 428/921 X |
| 3,962,164 | 6/1976 | Praetzel et al. | 252/8.1 X |
| 4,001,126 | 1/1977 | Marion et al. | 252/8.1 X |
| 4,013,476 | 3/1977 | Veda et al. | 252/8.1 X |
| 4,018,983 | 4/1977 | Pedlow | 428/921 X |
| 4,022,945 | 5/1977 | MacKenzie et al. | 252/8.1 X |
| 4,038,237 | 7/1977 | Snyder | 252/8.1 X |
| 4,039,709 | 8/1977 | Neuman | 428/920 X |
| 4,064,359 | 12/1977 | Peterson et al. | 428/920 X |

FOREIGN PATENT DOCUMENTS

| | | | |
|---|---|---|---|
| 31379 | 7/1904 | Switzerland | 174/121 A |
| 744435 | 2/1956 | United Kingdom | 138/122 |
| 913883 | 12/1962 | United Kingdom | 138/122 |
| 1175850 | 12/1969 | United Kingdom | 174/121 A |

*Primary Examiner*—Richard E. Aegerter
*Assistant Examiner*—James E. Bryant, III
*Attorney, Agent, or Firm*—Charles E. Bricker

[57] ABSTRACT

A hose construction and method of making same are provided wherein such hose construction is made primarily of combustible polymeric material and has a tubular inside surface defining a longitudinally extending passage for conveying a fluid therethrough and has an outside surface; and, the hose construction has at least one member which has a fire extinguishing material comprising same disposed adjacent one of the surfaces with the fire extinguishing material being activated upon subjecting the member to combustion temperatures.

25 Claims, 11 Drawing Figures

HOSE CONSTRUCTION HAVING INTEGRAL FIRE EXTINGUISHANT AND METHOD OF MAKING SAME

CROSS-REFERENCE TO RELATED APPLICATION

This application is related to U.S. pat. application Ser. No. 910,921 filed concurrently herewith.

BACKGROUND OF THE INVENTION

Hose made primarily of combustible material such as a combustible polymeric material, for example, are widely used throughout industry; and, often such hose are employed to convey flammable fluids which may ignite causing burning of the fluids as well as the hose themselves.

In an effort to make previous hose fire retardant it has been proposed to provide in such hose layers made of materials such as fiberglass, or the like. Although layers of fiberglass and like materials tend to retard the burning rate of a hose, it would be desirable if a hose could be made such that it is self extinguishing while aiding in the extinguishing of any fire in the immediate vicinity thereof, and particularly of any combustible fluid being carried therethrough.

SUMMARY

It is a feature of this invention to provide in a hose construction which is made primarily of combustible material, at least one member which comprises the hose construction and which has fire extinguishing material comprising same and wherein the fire extinguishing material serves to extinguish the hose construction in the event it commences burning.

Another feature of this invention is to provide a member of the character mentioned for such hose construction wherein substantially the entire member is made of a fire extinguishing material.

Another feature of this invention is to provide a member of the character mentioned for such a hose construction wherein the member is comprised of a tube having an enclosing wall made of a combustible material and containing fire extinguishing material therein.

Another feature of this invention is to provide a tubular member of the character mentioned for such a hose construction wherein the fire extinguishing material enclosed by the enclosing wall is in the form of solid particles of fire extinguishing material.

Another feature of this inventon is to provide a tubular member of the character mentioned for such a hose construction wherein the fire extinguishing material enclosed by the enclosing wall is in the form of a fire extinguishing liquid.

Another feature of this invention is to provide a corrugated hose construction defined by alternating projections and recesses and having at least one member comprising a fire extinguishing material disposed within certain recesses thereof.

Another feature of this invention is to provide in a hose construction having substantially right circular cylindrical inside and outside surfaces at least one member comprising fire extinguishing material.

Another feature of this invention is to provide an improved method of making a hose construction of the character mentioned.

Accordingly, it is an object of this invention to provide an improved hose construction and method of making same having one or more of the novel features set forth above or hereinafter shown or described.

Other features, objects, details, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 2:
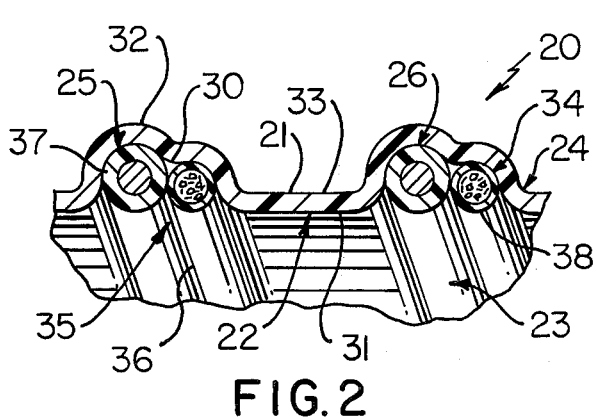
FIG. 2 is an enlarged fragmentary view with parts in cross-section and parts in elevation of the hose construction made utilizing the apparatus and method of FIG. 1.

Reference is now made to FIG. 2 of the drawings which illustrates one exemplary embodiment of the hose construction of this invention which is designated generally by the reference numeral 20. The hose construction 20 is made primarily of combustible polymeric material which is shown by cross hatching in the drawing as a synthetic plastic material; and, the hose construction has an undulating or corrugated wall 21 which has a tubular inside surface 22 defining a longitudinally extending passage 23 for conveying air, a combustible liquid or gas, or the like therethrough. The hose construction also has an outside surface 24.

Each of the surfaces 22 and 24 is defined by alternating projections and recesses, to be described later, along the axial length of the hose construction 20. The hose construction 20 also has a plurality of two helically wound electrically insulated wires 25 and 26 which serve as reinforcing wires for the hose construction 20 enabling such hose construction to be flexed or bent during normal use without collapse; and, the wires 25 and 26 serve as electrical conductors for purposes known in the art of flexible vacuum hose constructions.

The corrugated wall 21 of hose construction 20 is of substantially uniform wall thickness throughout; and, as will be readily apparent from FIG. 2 of the drawings, the inside surface 22 of hose construction 20 is defined by alternating recesses 30 and projections 31 while the outside surface 24 of such hose construction is defined by projections 32 and recesses 33 which correspond to recesses 30 and projections 31 respectively.

The hose construction 20 has the improvement which makes the hose construction substantially self extinguishing in the event wall 21, for example, of such hose construction or material carried therewithin reaches combustion temperatures and commences burning. In particular, the hose construction is comprised of at least one member and in this example has a plurality of two members each designated by the same reference numeral 34; and, each member has a fire extinguishing material comprising same.

In the hose construction 20 each member 34 is disposed adjacent the inside surface 22 and each member is disposed in a helical pattern with an associated wire 25 or 26. Each member 34 has each helical turn thereof disposed against an associated helical turn of its wire 25 or 26 essentially as illustrated at 35 in FIG. 2, for example. Further, suitable bonding means 36 may be provided, if desired, between adjoining turns of members 25-26 and associated members 34.

The fire extinguishing material comprising each member 34 is such that it is activated upon subjecting the member to combustion temperatures whereby the fire extinguishing material serves to help extinguish any burning in the vicinity thereof whether such burning is of corrugated wall 21, the electrically insulating plastic sleeve portion 37 of members 25 and 26, any combustible fluid contained within the hose construction 20, or any combustible material in the vicinity of such hose construction.

Figure 7:
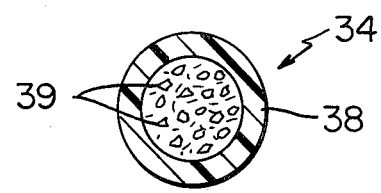
FIG. 7 is an enlarged cross-sectional view of a typical member which has fire extinguishing material comprising same and which comprises the hose constructions of FIGS. 2–5, for example.

As best seen in FIG. 7 of the drawings, each member 34 comprises a tube having an enclosing wall 38 made of a combustible material which in this example is in the form of a thermoplastic polymeric material and the enclosing wall 38 contains fire extinguishing material in the form of solid particles 39 of fire extinguishing material of a type to be described in detail subsequently. The solid particles 39 of fire extinguishing material when subjected to burning temperatures emit a fire extinguishing gas which serves to extinguish any fire in the vicinity thereof.

Figure 1:
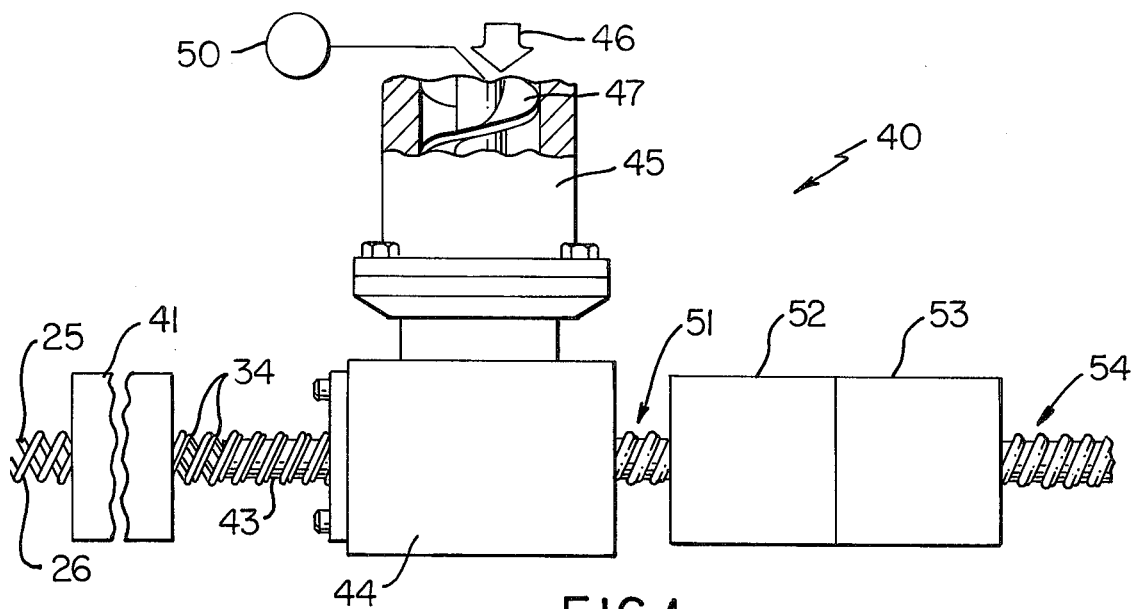
FIG. 1 is a view with parts in elevation, parts in cross-section, parts shown schematically, and parts broken away illustrating an exemplary apparatus and method which may be employed in making one exemplary embodiment of the hose construction of this invention.

The hose construction 20 may be made employing any apparatus or method known in the art and in this example of the invention the hose construction 20 is made employing the apparatus and method 40 illustrated in FIG. 1 of the drawings. In making the hose construction 20 the previously described two wires 25 and 26 are helically wound by a suitable apparatus (not shown) and such apparatus may be similar to the apparatus disclosed in U.S. Pat. No. 3,724,507 which is suitably modified to enable helically winding a plurality of two wires simultaneously; and, the disclosure of the above mentioned patent is incorporated herein by reference. The wires 25 and 26 after helical winding thereof, have a pair of members 34 which are also disposed in helically wound relation thereagainst and any suitable apparatus known in the art may be employed for this purpose and is shown schematically and designated by the reference numeral 41 whereby the wires 25-26 may have adjoining helically wound members bonded on one side thereof by the previously mentioned bonding means 36. The bonding means 36 may be any suitable adhesive means known in the art such as a separate externally applied adhesive, heat fusion of adjoining polymeric portions, or softening of adjoining polymeric portions by solvent action with bonding taking place upon rehardening thereof.

The members 34 need not necessarily be bonded to wires 25 and 26 but may have tube 21 disposed therearound in a simultaneous manner with the disposal of such tube around the wires 25 and 26. During formation and disposal of such tube, portions of the tube 21 urged around the helical turns of the members 25, 26, and 34 serve to hold such members in their helical pattern and against each other.

Suitable adhesive means may also be provided against the outside surface of each polymeric sleeve portion 37 of each wire 25 and 26 as well as against the outside surfaces of the enclosing walls 38 of members 34. Thus, once tube 21 is formed in position it is also suitably bonded against the outermost portions of the helical turns of members 25, 26, and 34.

The members 25, 26, and 34 in their helically wound condition are continuously moved in a nonrotating manner by a suitable rotatable mandrel or feed screw 43 through an extruder head 44 where a single thickness seamless layer of polymeric material defining corrugated layer or tube 21 is defined therearound. The extruder head 44 receives a flowable polymeric material from a extruder barrel 45 which receives the polymeric material under pressure from a source thereof, of any known type, which is designated schematically by an arrow 46. The barrel 45 has a feed screw 47 rotatably supported therein and the feed screw 47 is driven by drive motor 50. The polymeric material defining the corrugated tube 21 is fed through the barrel 45 and through a suitable orifice (not shown) in the extruder head 44 to define a seamless tube which shrinks against the helically coiled components 25, 26, and 34 to define the corrugated tube 21 and the rate of flow of polymeric material through such orifice is correlated with the feeding movement of the wires 25 and 26 and members 34 through the extruder head to assure provision of the desired wall thickness in the completed corrugated tube.

The hose construction 20 exits the extruder head 44 as shown at 51, in a hot condition and such hose construction is then moved through a cooling chamber 52 where it is cooled employing any suitable cooling medium such as spray nozzles of cooling water, a cold water bath, or the like. The cooled hose construction is then moved through a drying chamber 53 where it is suitably dried by employing any suitable drying apparatus which may comprise nozzles impinging hot air against the hose construction 20. The cooled and dried hose construction 20 exits the drying chamber 53 as shown at 54 and may be suitably cut into or severed into predetermined lengths or sections thereof as determined by the application thereof or such hose construction may be wound in roll form to define a supply roll thereof for subsequent use.

In the hose construction 20 a plurality of two elongate members 34 are helically wound with wires 25 and 26 and the coil turns of components 25, 26, and 34 disposed within recesses 30 of the inside surface 22. One member 34 is helically wound and disposed against an associated side of an associated wire, either 25 or 26.

Other exemplary embodiments of the hose construction of this invention are illustrated in FIGS. 3, 4, 5, 10 and 11 of the drawings. The hose constructions illustrated in FIGS. 3, 4, 5, 10 and 11 are similar to the hose construction 20; therefore, such hose constructions will be designated by the reference numerals 20A, 20B, 20C, 20D and 20E respectively and representative parts of each hose construction which are similar to corresponding parts of the hose construction 20 will be designated in the drawings by the same reference numerals as in the hose construction 20 (whether or not such components are mentioned in the specification) followed by the associated letter designation either A, B, C, D or E and not described again in detail. Only those components parts of each hose construction which are substantially different from corresponding parts of the hose construction 20 will be designated by a new reference numeral also followed by the associated letter designation and described in detail.

Figure 3:
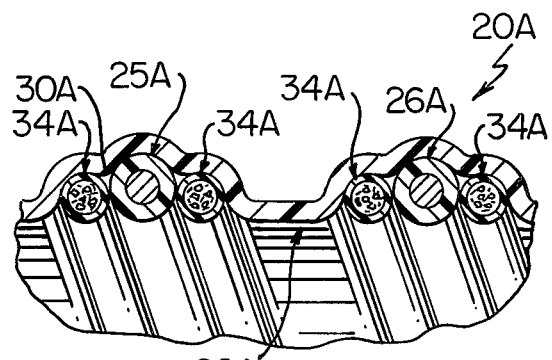
FIG. 3 is a view similar to FIG. 2 illustrating another exemplary embodiment of the hose construction of this invention.

The main difference between the hose construction 20 and the hose construction 20A of FIG. 3 is that the hose construction 20A has a pair of helically coiled members 34A disposed with their helical turns on opposite sides of and against each wire 25A and 26A. Accordingly, each helical turn of wire 25A has helical turns of a pair of members 34A disposed against opposite sides thereof. Similarly each helical turn of wire 26A has another pair of members 34A disposed against opposite sides thereof. The helical turns of wires 25A and 26A and the helical turns of their associated members are disposed in associated recesses 30A of the inside surface 22A. The hose construction 20A may be made in a similar manner as the hose construction 20 and employing apparatus similar to the apparatus 40 illustrated in FIG. 1.

Figure 4:
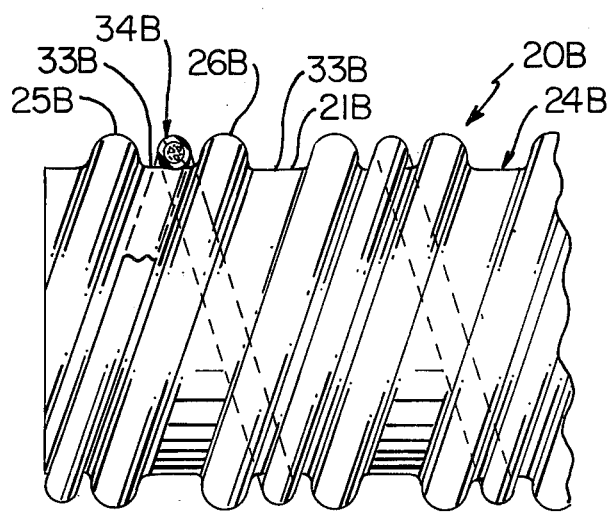
FIG. 4 is a fragmentary view primarily in elevation and with a part thereof in cross-section of another exemplary embodiment of the hose construction of this invention.

The hose construction 20B of FIG. 4 is initially made as a conventional corrugated hose construction comprising a corrugated wall 21B having dual purpose reinforcing and electrical conductor wires 25B and 26B disposed therewithin and against its inside surface 22B. A single elongate member 34B is provided which has fire extinguishing material comprising same and member 34B is helically wound and disposed against the outside surface 24B of the corrugated wall 21B. In particular, helically wound member 34B is provided within recesses 33B comprising the outside surface 24B and inasmuch as only a single helically wound member 34B is provided alternate recesses 33B of surface 24B are vacant. However, if desired, a pair of elongate members 34B may be helically wound in position in a manner to be subsequently described whereby all recesses 33B comprising the outside surface 24B would be filled each with an associated elongate member 34B.

Figure 5:
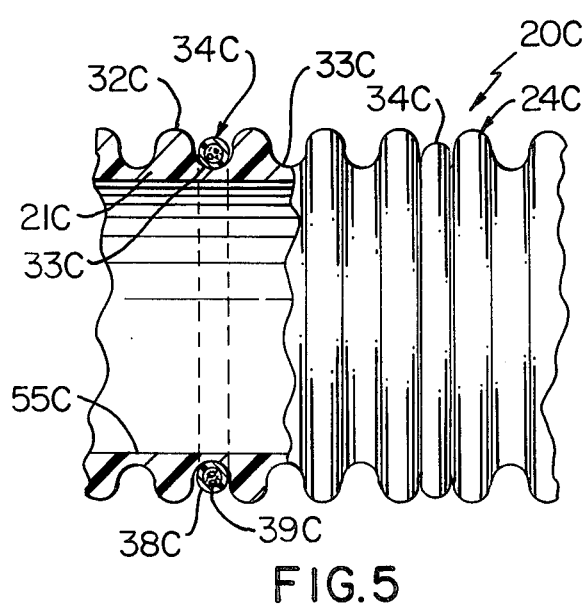
FIG. 5 is a fragmentary view with parts in elevation and parts in cross-section of another exemplary embodiment of the hose construction of this invention.

The hose construction 20C of FIG. 5 comprises a wall 21C which has a substantially smooth right circular cylindrical inside surface 55C and a corrugated outside surface 24C which is defined by alternating annular projections 32C and recesses 33C. The hose construction 20C has at least one member 34C which has fire extinguishing material comprising same and in thisexample (FIG. 5) the hose construction 20C has a plurality of members 34C in the form of annular members 34C. Each member 34C is disposed in an associated recess 33C of outside surface 24C and the members 34C are provided at predetermined intervals along the length of the hose construction 20C. Each member 34C comprises an enclosing wall in the form of a hollow toroidal wall 38C which has solid particles 39C of fire extinguishing material suitably disposed therewithin in a substantially compacted manner. Each member 34C with its toroidal tubular wall 38C with particles 39C disposed thereeithin may be made utilizing any suitable technique known in the art.

The hose construction 20C and particularly tubular wall 21C of such hose construction may be made utilizing any suitable technique known in the art. For example, such hose construction may be made essentially as disclosed in U.S. Pat. No. 3,891,007 and the disclosure of this patent is incorporated herein by reference. Each annular member 34C may be suitably installed in position in an associated recess 33C by partially collapsing tubular wall 21C adjacent such associated recess and then axially moving the toroidal member 34C in position in such associated recess. It will also be appreciated that instead of placing toroidal members 34C in selected recesses, all recesses 33C may be filled with members 34C and as determined by the application of the hose construction 20C.

Figure 6:
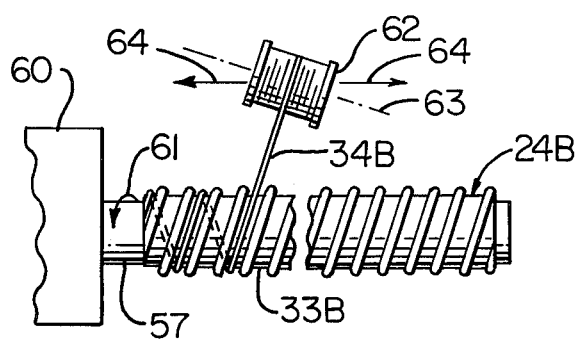
FIG. 6 is a primarily schematic view illustrating an exemplary technique for helically winding an elongate member having a fire extinguishing material comprising same about a straight length of a corrugated hose construction.

The hose construction 20B of FIG. 4 may have its associated member 34B helically wound in position therearound utilizing any suitable apparatus or method known in the art. For example, a predetermined length of such hose construction may be provided, as shown in FIG. 6, on a rotatable mandrel 57 of an apparatus 60 and suitably detachably fastened to such mandrel. The mandrel 57 may be rotated by its apparatus 60 as indicated by the arrow 61. The elongate member 34B may be provided on a supply roll 62 thereof and supported for controlled unwinding rotation about a central axis 63 of supply roll 62. To wind member 34B in position, the leading end portion thereof may be suitably attached to the corrugated wall portion 21B whereupon the mandrel 57 is rotated by its apparatus 60 to unwind member 34B from its supply roll 62. A support apparatus indicated schematically by arrows 64 may be provided for supporting and moving the supply roll 62 parallel to the axis of the hose construction 20B and mandrel 57 during unwinding of the member 34B from its supply roll and against tubular wall 21B.

With the above procedure the predetermined length of hose construction 20B has member 34B disposed within alternating recesses 33B along the entire length of its wall 21B whereupon the trailing end portion of member 34B is severed and fixed in position while sealing the enclosing wall 38B thereof against loss of particles 39B of fire extinguishing material. The hose construction 20B with member 34B disposed in position is then removed from the mandrel 57 and a new predetermined length detachably fastened thereon for installation of its member 34B in position therein. If desired, suitable bonding or adhesive means 36B may be applied against the outside surface of the member 34B as it is unwound from the supply roll 62 to bond the member 34B within recesses 33B of the outside surface 24B. It will also be appreciated that, if desired, a plurality of two members 34B may be simultaneously disposed within recesses 33B so that all of such recesses are filled with turns of two members 34B.

Figure 10:
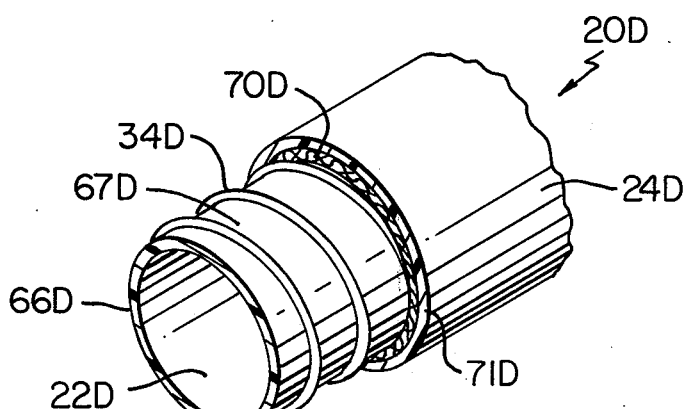
FIG. 10 is a fragmentary perspective view illustrating an exemplary embodiment of a multiple layer hose construction of this invention which employs a member comprising a fire extinguishing material interposed between certain layers thereof.

The hose construction 20B of FIG. 10 is a multiple layer hose construction and comprises an inner tubular layer 66D made of a polymeric material such as a synthetic plastic material and layer 66D has a right circular cylindrical inside surface 22D which defines the inside surface of the hose construction 20D. The inner layer 66D has an outside surface 67D which has a member 34D helically wound therearound; and, the hose construction 20D has a reinforcing layer 70D, which may be made of any suitable reinforcing material, sandwiching the helically wound member 34D against the outside surface 67D of the inner layer 66D. The hose construction 20D also has an outer layer 71D made of polymeric material such as a synthetic plastic and outer layer 71D is disposed against the outside surface of the reinforcing layer 70D. The outer layer 71D has an outside surface which is also designated by the reference numeral 24D and surface 24D is a right circular cylindrical outside surface whereby the outside surface of hose construction 20D is right circular cylindrical.

Thus, it is seen that the elongate member 34D comprised of fire extinguishing material is provided within the multiple layer reinforced hose construction 20D and disposed in sandwiched relation between a pair of layers as shown in FIG. 10.

Figure 11:
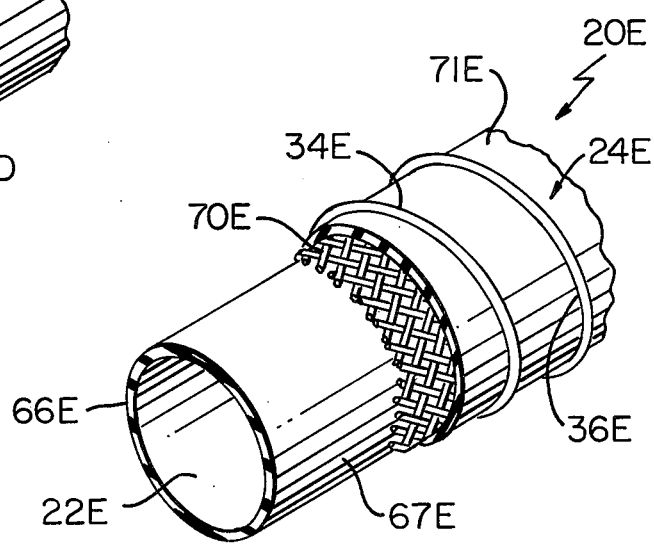
FIG. 11 is a view similar to FIG. 10 illustrating another exemplary embodiment of a multiple layer hose construction of this invention.

The hose construction 20E of FIG. 11 is also a multiple layer reinforced hose construction and has an inner layer 66E made of a polymeric material in the form of rubber and layer 66E and hence hose 20E has a right circular cylindrical inside surface 22E. The hose construction 20E has a reinforcing layer which may be in the form of a braided layer 70E disposed concentrically around and against the outside surface 67E of layer 66E; and, hose construction 20E has an outer layer 71E disposed against the outside surface of the braided layer 70E. The hose construction 20E has a member 34E comprising a fire extinguishing material disposed in a helical pattern around the outside surface around the outer layer 71E. The member 34E is substantially identical to the member 34 previously described and may be suitably bonded by adhesive means 36E at locations where it adjoins the outside surface 24E.

The helical angle, number of turns per unit of length, cross-sectional area, and configuration of member 34E is determined in each instance by the application of the hose construction 20E.

In this disclosure of the invention the hose constructions 20, 20A, 20B, 20C, and 20D have been described as being made of a polymeric material in the form of a synthetic plastic material. Further, the hose construction 20E has been described as being made primarily of rubber material. However, it is to be understood that the hose construction 20E may also be made with its layers primarily of synthetic plastic material and the hoses 20 and 20A-20B may be made of polymeric material in form of rubber.

The hose constructions 20, 20A, 20B, 20C, 20D, and 20E presented in this disclosure of the invention employ members 34, 34A, 34B, 34C, 34D and 34E respectively. However, each member 34A through 34E is substantially identical to the member 34 shown in detail in FIG. 7. The description made in connection of member 34 is fully applicable to members 34A through 34E regardless of whether each member is of elongate form and wrapped in a helical pattern or in a toroidal form.

Figure 8:
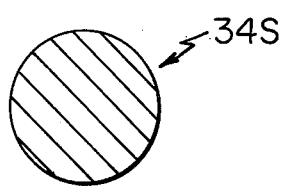
FIG. 8 is a cross-sectional view of another exemplary embodiment of a member having fire extinguishing material comprising same.
Figure 9:
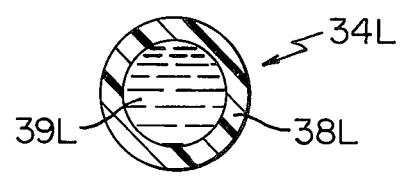
FIG. 9 is a cross-sectional view of another exemplary embodiment of a member having fire extinguishing material comprising same.

It will also be appreciated that instead of using member 34, 34A, 34B, 34C, 34D, and 34E in each of the hose constructions presented in this disclosure member 34S or 34L may be provided essentially as disclosed in FIGS. 8 and 9 respectively and used as desired. Member 34S of FIG. 8 is in essence of solid cross section and is shown by general cross hatching; and, member 34S may be made of any suitable solid fire extinguishing material with the fire extinguishing material being activated upon subjecting such member to combustion temperatures. It will also be seen that member 34L of FIG. 9 is also in the form of a tube having an emclosing wall 38L which has fire extinguishing material in the form of a fire extinguishing liquid 38L disposed therein. As in the case of the solid particles 38 of fire extinguishing material the solid member 34S and fire extinguishing liquid 38L are activated once the associated member is subjected combustion temperatures.

The cross-sectional configuration of each member 34, 34A-34E, 34S, and 34L is shown as being circular. However, it is to be understood that each member may be other than of circular cross-sectional configuration. Further, the enclosing wall each tubular member may be noncircular on both its inside and outside surface.

The particles 38 and 38A-38E may be particles of any suitable fire extinguishing material and such particles may be also be referred to herein as fire extinguishants. The particles may be made of dry chemical fire extinguishing material such as ammonium phosphate; bicarbonate based compounds; or a mixture of bicarbonate based material, potassium, and silicone. The solid particles may have a particle size ranging between roughly one millimeter and 4 millimeters.

The liquid fire extinguishing material comprising the member 34L may be any suitable material.

The solid fire extinguishing material comprising member 34S may be any suitable material.

The enclosing wall of each of the various members 34, 34A-34E, and 34L may be made of any suitable combustible material such as polyvinyl chloride, or the like. Further, outside and inside dimensions, and wall thickness of each of the enclosing walls will be selected as determined by the application of the hose construction.

While present exemplary embodiments of this invention, and methods of practicing the same, have been illustrated and described, it will be recognized that this invention may be otherwise variously embodied and practiced within the scope of the following claims.

What is claimed is:

1. In a hose construction made primarily of combustible material and having a tubular inside surface defining a longitudinally extending passage for conveying a fluid therethrough and having an outside surface, the improvement comprising, at least one member which has a fire extinguishing material comprising same, said member being disposed adjacent one of said surfaces, said fire extinguishing material being activated upon subjecting said member to combustion temperatures, said member comprising an independent tube having an enclosing wall made of a combustible material and containing a fire extinguishing material therein, said fire extinguishing material being exposed and free to act upon destruction of said enclosing wall by subjecting same to said combustion temperatures.

2. In a hose construction as set forth in claim 1 which is made of said combustible material in the form of a polymeric material, the further improvement in which said enclosing wall of said member is also made of said polymeric material.

3. In a hose construction as set forth in claim 2 the further improvement in which said enclosing wall of said member is made of said polymeric material in the form of a synthetic plastic material.

4. In a hose construction as set forth in claim 3 the further improvement in which said enclosing wall of said member is made of said polymeric material in the form of polyvinyl chloride.

5. In a hose construction as set forth in claim 2 the further improvement in which said one member is an elongated member disposed in a helical pattern against said inside surface.

6. In a hose construction as set forth in claim 2 the further improvement in which said enclosing wall is a hollow toroidal wall.

7. In a hose construction as set forth in claim 2 the further improvement in which said enclosing wall is a hollow toroidal wall made of polyvinyl chloride.

8. In a hose construction as set forth in claim 1 the further improvement comprising at least another member which is identical to said one member and has a fire extinguishing material comprising same, said other member also being disposed adjacent one of said surfaces, said fire extinguishing material of said other member also being activated upon subjecting said other member to said combustion temperatures.

9. In a hose construction as set forth in claim 8 the further improvement in which said one member and said other member are each in the form of an elongate member disposed in a helical pattern against one of said surfaces.

10. In a hose construction as set forth in claim 2 the further improvement in which said fire extinguishing material is defined by solid particles of fire extinguishing material.

11. In a hose construction as set forth in claim 2 the further improvement in which said fire extinguishing material is defined by a fire extinguishing liquid.

12. In a corrugated hose construction made primarily of combustible polymeric material and having a tubular inside surface defining a longitudinally extending passage for conveying a fluid therethrough and having an outside surface with each of said surfaces being defined by alternating projections and recesses along the axial length of said hose construction, said hose construction having dual purpose wires helically wound therealong and disposed within recesses of said inside surface, said wires serving as reinforcing wires and electrical conductors, the improvement comprising, at least one elongate member which has a fire extinguishing material comprising same, said member being disposed within recesses of one of said surfaces, said fire extinguishing material being activated upon subjecting said member to combustion temperatures, said member comprising an independent tube having an enclosing wall made of a combustible material and containing a fire extinguishing material therein, said fire extinguishing material being exposed and free to act upon destruction of said enclosing wall by subjecting same to said combustion temperatures.

13. In a corrugated hose construction as set forth in claim 12 the further improvement in which said member is disposed against one side of and extends in a helical pattern with one of said wires within recesses of said inside surface.

14. In a corrugated hose construction as set forth in claim 13 the further improvement comprising another member which is identical to said first member and has a fire extinguishing material comprising same, said other member being disposed against an opposite side of said one wire and extending in a helical pattern therewith within recesses of said inside surface.

15. In a corrugated hose construction as set forth in claim 12 the further improvement in which said member is disposed within recesses of said outside surface.

16. In a multiple layer hose construction made primarily of combustible material and having a tubular inside surface defining a longitudinally extending passage for conveying a fluid therethrough and having an outside surface, the improvement comprising, at least one member which has a fire extinguishing material comprising same, said member being disposed adjacent one of said surfaces, said fire extinguishing material being activated upon subjecting said member to combustion temperatures, said member comprising an independent tube having an enclosing wall made of a combustible material and containing a fire extinguishing material therein, said fire extinguishing material being exposed and free to act upon destruction of said enclosing wall by subjecting same to said combustion temperatures.

17. In a hose construction as set forth in claim 16 the further improvement in which said member is helically wound and disposed in sandwiched relation between a pair of said layers.

18. In a hose construction as set forth in claim 16 the further improvement in which said member is helically wound and disposed against said outside surface.

19. In a hose construction as set forth in claim 18 the further improvement comprising means bonding said member against said outside surface.

20. In a method of making a hose construction primarily of combustible material and having a tubular inside surface defining a longitudinally extending passage for conveying a fluid therethrough and having an outside surface, the improvement comprising the method steps of, providing at least one member which has a fire extinguishing material comprising same, and disposing said member adjacent one of said surfaces, said fire extinguishing material being activated upon subjecting said member to combustion temperatures, said providing step comprising providing said member in the form of an independent tube having an enclosing wall made of a combustible material, and placing a fire extinguishing material within said tube, said fire extinguishing material being exposed and free to act upon destruction of said enclosing wall.

21. In a method of making a hose construction as set forth in claim 20 the further improvement in which said placing step comprises placing said fire extinguishing material therewithin in the form of solid particles of fire extinguishing material.

22. In a method of making a hose construction as set forth in claim 20 the further improvement in which said placing step comprises placing said fire extinguishing material in the form of a fire extinguishing liquid.

23. In a method of making a hose construction as set forth in claim 20 the further improvement in which said disposing step comprises disposing said member in a helical pattern against said inside surface.

24. In a method of making a hose construction as set forth in claim 20 the further improvement in which said disposing step comprises disposing said member in a helical pattern against said outside surface.

25. In a method of making a hose construction as set forth in claim 20 the further improvement in which said providing step comprises providing said member in the form of a toroidal member and said disposing step comprises disposing said toroidal member against said outside surface.

* * * * *